June 22, 1943. W. E. BIBLE Re. 22,336

VACUUM CLEANER

Original Filed April 5, 1940 4 Sheets-Sheet 1

INVENTOR
WALTER E. BIBLE
BY
R. H. Galbreath
ATTORNEY

June 22, 1943. W. E. BIBLE Re. 22,336.

VACUUM CLEANER

Original Filed April 5, 1940 4 Sheets-Sheet 2

INVENTOR
WALTER E. BIBLE.
BY
ATTORNEY

June 22, 1943. W. E. BIBLE Re. 22,336

VACUUM CLEANER

Original Filed April 5, 1940 4 Sheets-Sheet 3

INVENTOR
WALTER E. BIBLE.
BY
ATTORNEY

June 22, 1943. W. E. BIBLE Re. 22,336

VACUUM CLEANER

Original Filed April 5, 1940 4 Sheets-Sheet 4

INVENTOR
WALTER E. BIBLE.
BY
ATTORNEY

Reissued June 22, 1943 Re. 22,336

UNITED STATES PATENT OFFICE 22,336

VACUUM CLEANER

Walter E. Bible, Denver, Colo., assignor to The Western Battery and Supply Company, Denver, Colo., a corporation of Colorado Original No. 2,247,472, dated July 1, 1941, Serial No. 327,976, April 5, 1940. Application for reissue June 10, 1942, Serial No. 446,515

22 Claims. (Cl. 183—35)

This invention relates to vacuum cleaners, more particularly to a portable vacuum cleaner of the household type.

The principal object of the invention is to provide a simple, light-weight, and efficient vacuum cleaner construction in which the debris from the air will collect in a receiving receptacle which can be easily removed from the cleaner and quickly dumped and replaced; in which the fabric air filter medium will be subject to but a minimum of dust and dirt so that it will maintain maximum porosity for a greater length of time than present filters; and to provide a cleaner in which the fabric air filter or strainer can be quickly and completely cleaned and renewed without removing it from the cleaner.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

Figure 1:
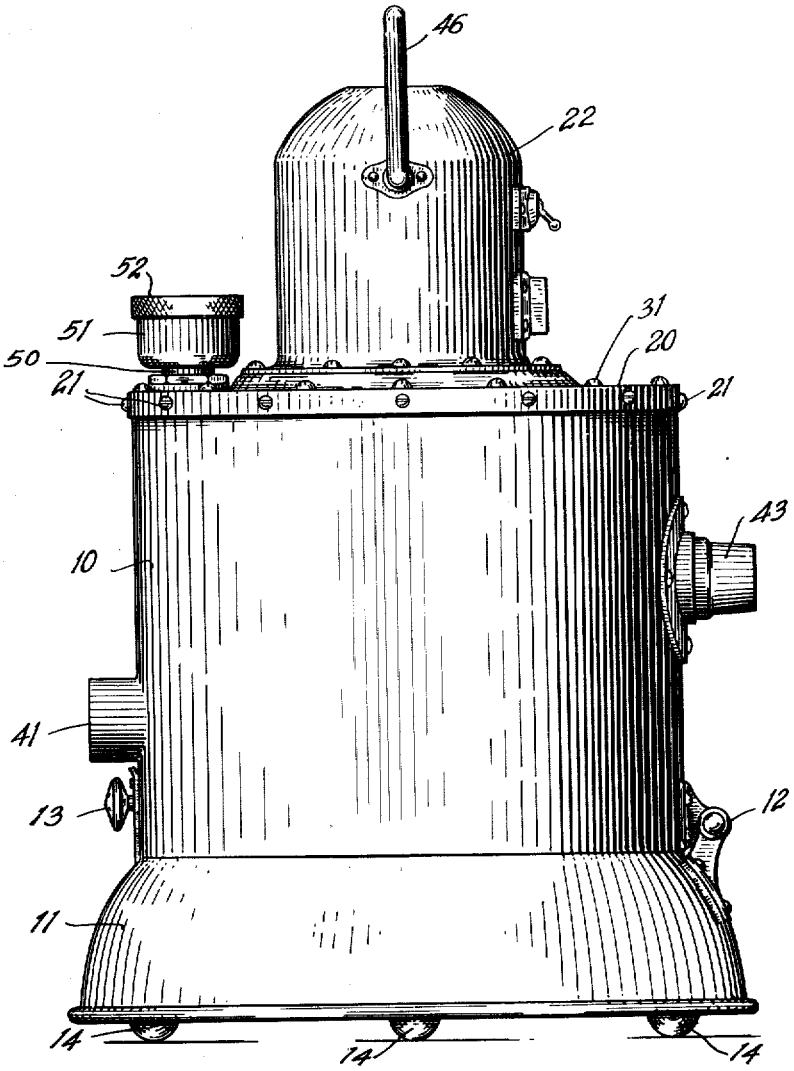
Figure 1 is a side view of one form of the improved vacuum cleaner.
Figure 2:
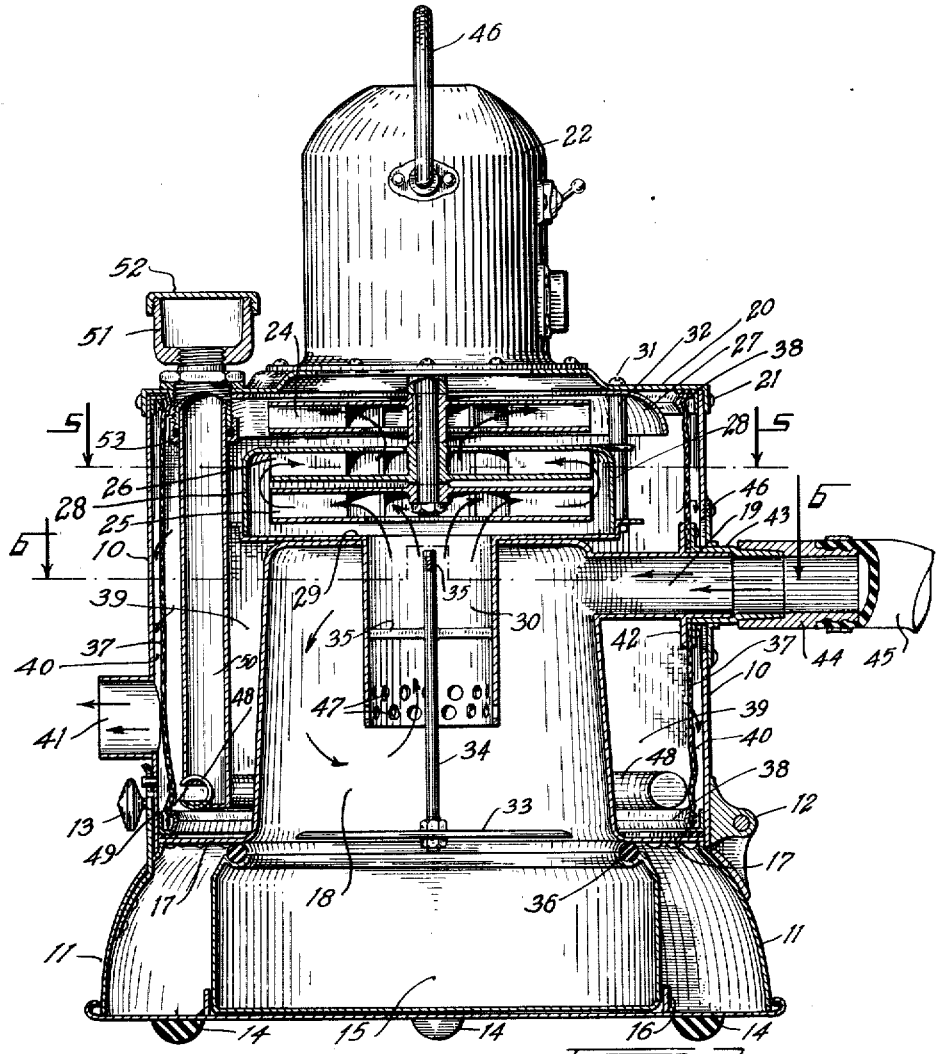
Figure 2 is a vertical section therethrough, taken on the line 2—2, Figure 6.

The improved vacuum cleaner consists of a cylindrical housing 10 hinged to an enlarged hollow base member 11 by means of suitable hinges 12. At the side opposite the hinges the housing and base are detachably secured together by means of a suitable latch 13. The bottom of the housing is completely closed, as illustrated, and suitable rubber feet 14 or other suitable supports may be attached to the bottom. A dirt receiving pan 15 rests within the base member on the bottom wall thereof being held in its proper place thereon by a retaining flange 16. A bottom plate 17 is secured in the bottom of the housing 10 and extends upward at its middle to form a circular whirl chamber 18 having a tangential inlet tube 19 which extends outwardly through the wall of the housing. The top of the housing is closed by means of a top plate 20 which is flanged downwardly at its periphery and secured to the upper edge of the housing by means of suitable attachment screws 21.

The top plate carries a suitable electric motor 22 secured thereon and provided with a carrying bail 46. A vertical motor shaft 23 extends downward from the motor into the housing, and carries two spaced-apart, blower-type rotors thereon—an upper or second stage rotor 24 and a lower or first stage rotor 25, both of which are of the shrouded type with open centers for the intake of air. Between the two rotors is a stationary series of stabilizing blades 26 which direct the whirling air which discharges from the first rotor into the intake of the second stage rotor.

The second stage rotor discharges into a deflecting shield 27 which directs the air downwardly into the housing around the entire circumference thereof. The first stage rotor is enclosed in a blower housing 28, the bottom face of which is closed by means of a bottom plate 29 from which an axial intake sleeve 30 projects downward into the whirl chamber 18. The deflector shield 27, blower housing 28, vanes 26, bottom plate 29, and intake sleeve 30 are supported from the top plate 20 upon suitable clamp bolts 31 and separating tubes 32 so that the entire assembly can be removed as a unit.

A circular protecting plate 33 is supported in the bottom of the whirl chamber upon the lower extremity of a supporting rod 34. The rod is maintained in an axial position within the sleeve 30 by means of radial arm members 35. The plate 33 is of less diameter than the whirl chamber so as to leave an annular passage about its periphery for the entrapped dirt to pass to the pan 15. The plate is removable from the rod to allow the latter to be withdrawn upward through the sleeve opening in the top of the whirl chamber. A ring gasket 36 is secured about the top of the pan 15 to seal the latter to the whirl chamber 18.

A cylindrical fabric filter drum 37 is supported within the housing between two end rings 38. The latter are so designed as to fit snugly within the housing and to hold the fabric spaced from the housing wall to form an inner filter chamber 39 and an outer discharge chamber 40. The discharge chamber opens to the atmosphere through a suitable discharge opening 41. The inlet tube 19 is flanged as shown at 42 at the point where it passes through the fabric and the latter is clamped against the flange by means of a flanged nipple fitting 43 designed to receive a standard vacuum cleaner hose coupling 44 of a flexible cleaner hose 45. A sealing flange 46 closes the housing about the fitting 43. The hose may be provided with any of the usual attachments for use on the desired work.

*Operation*

The blower action of the rotors 24 and 25 draws air upwardly through the intake sleeve 30 creating a partial vacuum in the whirl chamber. This draws the air from the cleaner hose through the inlet tube 19 into the whirl chamber. The air enters tangentially and at high speed.

The centrifugal force of the air throws the dirt particles outward against the wall of the chamber and the particles quickly gravitate to the dirt pan 15. The incline of the side walls assists in forcing the dirt and dust downwardly to the pan. The sudden drop in velocity on entering the enlarged whirl chamber also causes the suspended particles to fall and this is assisted by the fact that the air is forced first downwardly thence sharply upward into the intake sleeve 30 causing the remaining suspended particles to deposit. The air about the intake sleeve, being in the center of the whirl, is the cleanest air this air is allowed to flow directly into the sleeve through suitable perforations 47 therein. The remaining deposited foreign material falls to the plate 33 and is swept therefrom by the swirling air currents into the pan 15.

The air flowing from the rotors into the filter chamber 39 is almost entirely free from foreign materials. Occasionally, exceedingly light particles of dust, etc. may reach this chamber and these are removed by the filtering action of the fabric drum 37 so that the air discharging from the discharge chamber 40 through the outlet 41 is in an even more purified condition than the ordinary room atmosphere.

Due to the fact that practically all foreign materials are removed in the whirl chamber and to the fact that the fabric drum filter has a relatively large surface area there is but a minimum of accumulation on the surface of the fabric to create back pressure and interfere with suction. Even this small amount however can be quickly and easily removed without opening the cleaner or removing the fabric drum.

*Cleansing filter surface*

The cleansing of the filter surface is accomplished through the medium of what will be herein designated as the filter-cleaning nozzle or cleaner ring. The latter comprises an annular tube 48 which extends around the filter chamber 39 in close proximity to the fabric wall thereof. The outer face of the tube 48 is provided with a slot 49 extending entirely around the ring. The ring is supported from the lower extremity of a riser tube 50 which communicates with the hollow interior of the ring.

The riser tube 50 extends upwardly through the top plate 20 terminating in a cup fitting 51 which is normally closed by means of a cap 52. At the point where the tube 50 passes through the top plate, it is slidably mounted in a packing nipple 53 which is threaded downward through the top plate. A packing nut is threaded on the bottom of the nipple 53 to form a packing gland in which suitable packing 54 is placed to prevent air leakage about the tube 50 although the latter is freely slidable. The entire cleaner ring can be drawn upward in the filter chamber by simply withdrawing the riser tube 50. That portion of the cleaner ring below the inlet tube 19 is cut away to allow the ring to pass upward by the inlet tube. The extremities of the tube 48 at the cut away portion are closed.

Figure 3:
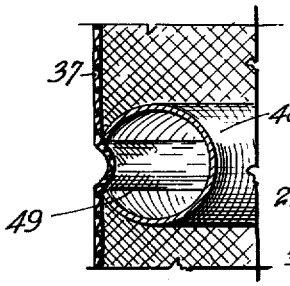
Figure 3 is an enlarged detail sectional view through the filter-cleaning nozzle or ring illustrating its action when cleaning the fabric wall of the filter chamber.
Figure 4:
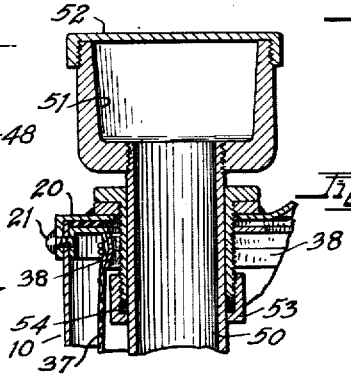
Figure 4 is an enlarged detail sectional view across the upper extremity of the riser tube.
Figure 5:
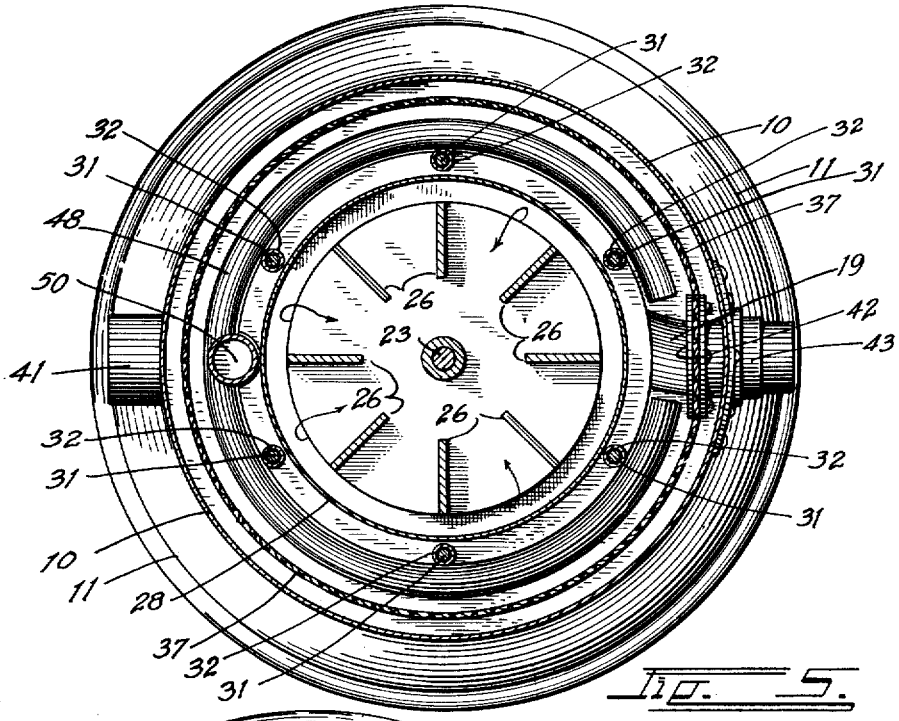
Figure 5 is a horizontal section, looking downward on the line 5—5, Figure 2.
Figure 6:
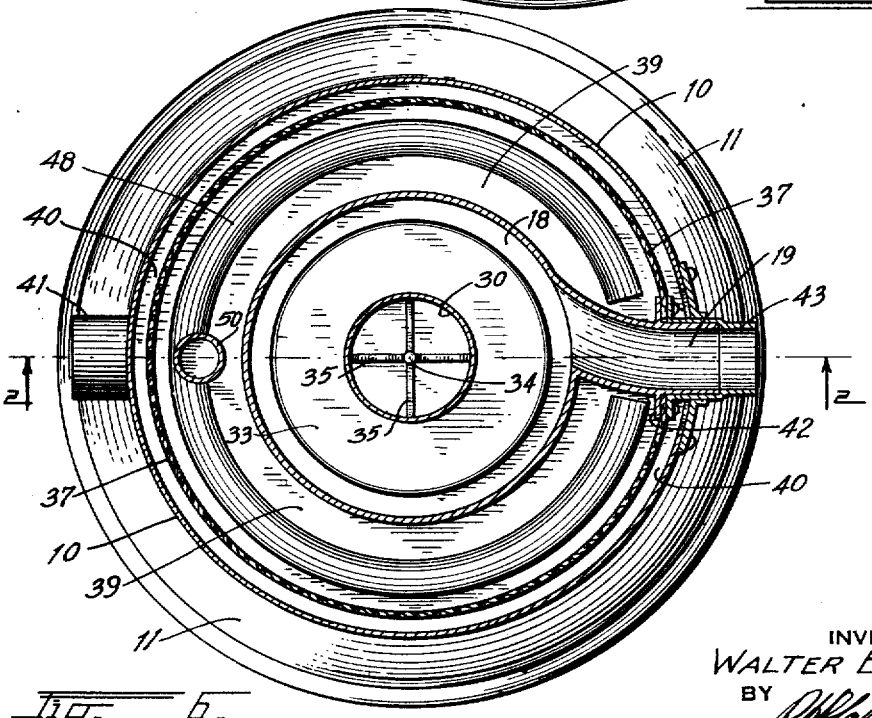
Figure 6 is a similar section looking downward on the line 6—6, Figure 2.
Figure 7:
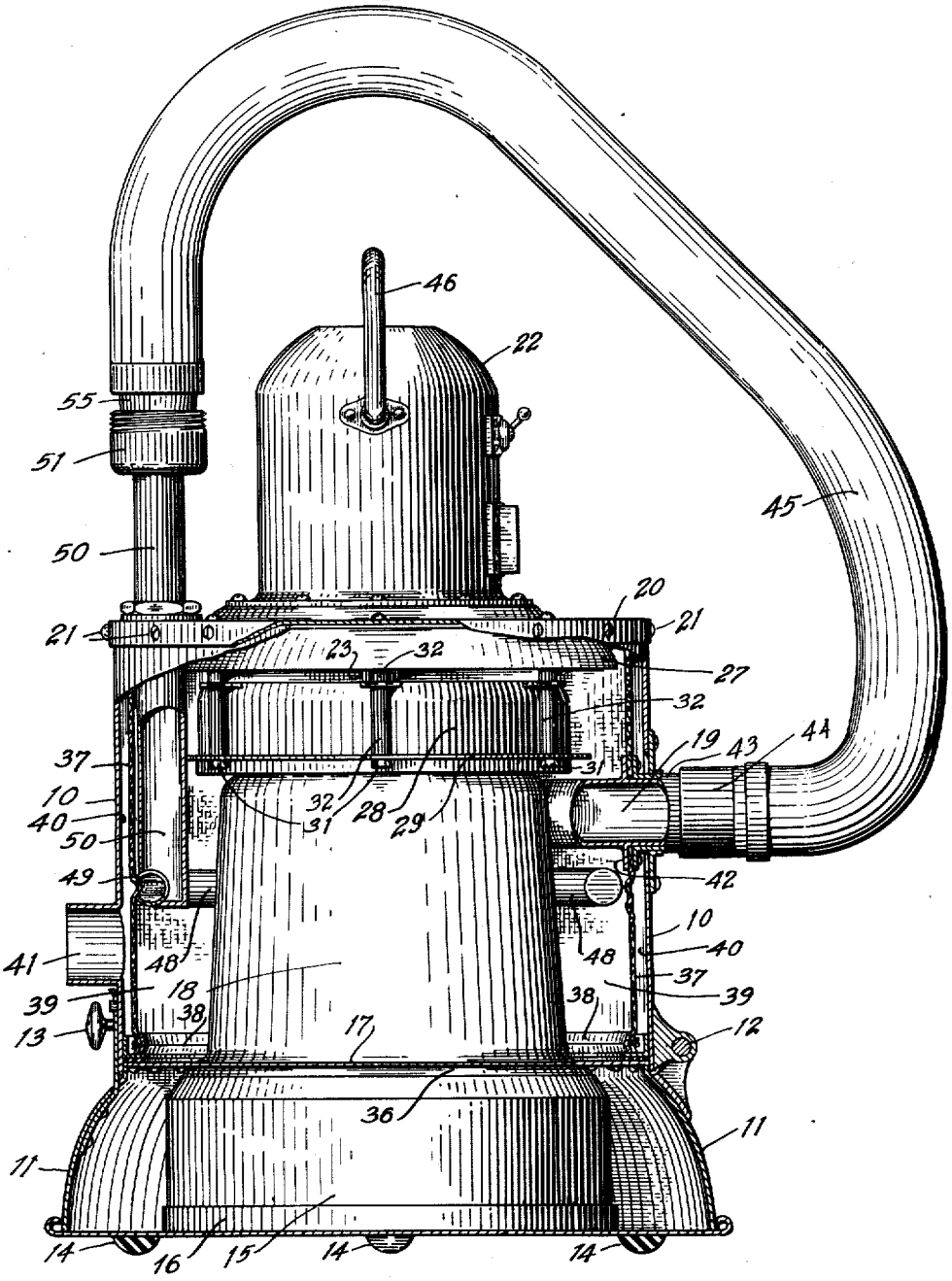
Figure 7 is a side elevation, partially broken away, illustrating the invention as it appears during the filter chamber cleaning operation.

To employ the cleaner ring, the cap 52 is removed from the cup fitting 51 and the male extremity (indicated at 55) of the hose 45 is inserted in the cup fitting 51 as shown in Figure 7. This draws the air from the cleaner ring and draws the fabric wall against, and partially into, the slot 49 as shown in Figure 3.

The air now flows in reverse direction and at high velocity through the fabric filter where contacted by the nozzle slot and all adhering material is quickly removed therefrom. The riser tube is now drawn upwardly to cause the cleaner ring to travel the full length of the fabric wall and is then forced downward to its former position. The movement of the cleaner ring subjects the fabric to a simultaneous bending and scraping while the air is rushing therethrough so that a complete and thorough cleaning is had. Practically all of the removed dirt is caught in the whirl chamber and collected in the pan 15.

To remove the pan 15 in order to discharge the collected foreign material the manually operable catch 13 is released and the entire upper portion of the cleaner is tilted to one side on the hinge 12 thus allowing ready access to the pan 15. The cover plate 33 acts, in cleaner operation, to prevent the air currents of the whirl chamber from disturbing the accumulated dust in the dust pan 15. The whirl chamber is formed with a larger diameter at the bottom than at the top to assist the gravitation of the foreign materials downwardly along the walls thereof and reduce the velocity of air movement adjacent the dust pan.

While a specific form of the improvement has been described and illustrated herein, it should be understood that the same may be varied, within the scope of the appended claims, without departing from the spirit of the invention.

Having thus described the invention, what is claimed and desired secured by Letters Patent is:

1. A vacuum cleaner comprising: a hollow base member; a dust pan within said base member; a housing hinged to said base member so as to close thereover; a whirl chamber in said housing opening to said dust pan, said whirl chamber having a greater diameter at its bottom than at its top, said bottom being open; means for introducing air into said whirl chamber at its periphery; a motor-operated blower device supported from said housing; an intake sleeve from said blower device extending axially downward into said whirl chamber to evacuate air from the lower mid-portion thereof; a rod projecting downward from said sleeve; and a cover plate supported by said rod in the bottom of said whirl chamber partially covering said dust pan to prevent air agitation of the dust in the latter.

2. A vacuum cleaner comprising: a housing; a whirl chamber within said housing; means for introducing air tangentially into said whirl chamber directly from a cleaning nozzle or the like in the cleaning operation; a blower for withdrawing air axially from said whirl chamber; a filtering chamber within said housing for receiving air from said blower; a porous filtering wall within said housing and about said filter chamber through which the air discharges; and means for causing the air to reverse its normal direction through said wall at desired periods for cleaning said wall and for conducting foreign material removed from said wall directly to said whirl chamber.

3. A vacuum cleaner comprising: a whirl chamber; a housing enclosing said whirl chamber; means for introducing dust laden air through said housing and tangentially into said whirl chamber directly from a cleaning nozzle or the like in the cleaning operation; a porous filter wall in said housing surrounding and spaced from said whirl chamber to form an annular filter chamber thereabout; said filter chamber being closed at both its ends; a blower for withdrawing air from said whirl chamber and discharging said air into said filter chamber with sufficient pressure to force it through the porous filter wall, said housing being formed with a discharge opening.

4. A vacuum cleaner of the self-cleaning final filter type comprising: a whirl chamber; means for introducing dust laden air tangentially into said whirl chamber directly from a cleaning nozzle or the like in the cleaning operation; a porous filter wall surrounding and spaced from said whirl chamber to form an annular filter chamber thereabout, said filter chamber being closed at both its ends; a blower for withdrawing air from said whirl chamber and discharging said air into said filter chamber with sufficient pressure to force it through the porous filter wall; a hollow annular cleaner ring encircling said whirl chamber within said filter chamber, being movable therealong, and contacting said porous filter wall, said ring having a slot in its peripheral face open to its hollow interior; a suction tube extending from said cleaner ring through a closed end of said filter chamber and being slidable in the latter upon the movement of said ring relative to said wall; and means for connecting said suction tube with a source of suction to draw air inwardly through said wall into said ring for cleaning said wall.

5. In a vacuum cleaner of the type having a whirl chamber for preliminary air cleaning and adapted to receive dirt-laden air directly from a cleaning nozzle or the like in the cleaning operation, an air filtering chamber having a flexible porous wall for the final air cleaning, and a blower for drawing air into said whirl chamber and discharging same into said filtering chamber, means for cleaning the inner surface of said porous wall comprising: a cleaning nozzle within said filtering chamber; means operable from the exterior of said chamber for moving said nozzle over said wall; and means for connecting the suction side of the said whirl chamber to said nozzle so that material will be withdrawn from said wall and discharged directly into said whirl chamber.

6. A vacuum cleaner comprising: a housing; a whirl chamber in said housing adapted to receive dirt-laden air directly from a cleaning nozzle or the like in the cleaning operation; a dust receptacle below said whirl chamber; means for introducing air into said whirl chamber at its periphery; a motor-operated blower device; an intake sleeve from said blower device extending axially into said whirl chamber to evacuate the air from the midportion thereof; a porous partition wall in said housing between said whirl chamber and the wall of said housing dividing the latter into an annular filter chamber and an annular discharge chamber, said blower device discharging into said filter chamber; and means operable from the exterior of said filter chamber for cleaning said porous partition wall and returning collected material to said whirl chamber for separation.

7. A vacuum cleaner having a preliminary dirt separator adapted to receive dirt-laden air directly from a cleaning nozzle or the like in the cleaning operation, suction-creating means connected to said preliminary separator to draw air therethrough, a final dirt separator connected to said suction-creating means to receive air exhausted therefrom, dirt-removing means to remove foreign material from said final separator, and air-conducting means to connect said dirt-removing means to said preliminary dirt separator to enable air to be drawn therethrough by the suction in said preliminary separator.

8. A vacuum cleaner having a preliminary dirt separator adapted to receive dirt-laden air directly from a cleaning nozzle or the like in the cleaning operation and to remove nearly all foreign material from air passing therethrough, suction-creating means connected at its suction side to said preliminary separator to draw air therethrough, a final dirt separator connected to said suction-creating means to receive air exhausted therefrom and including a dirt-collecting element permeable to air and impermeable to dirt and on which dirt collects, dirt-removing means to remove dirt from said final separator, and air-conducting means to connect said dirt-removing means to said suction-creating means and including said preliminary separator.

9. A vacuum cleaner having a preliminary dirt separator adapted to receive dirt-laden air directly from a cleaning nozzle or the like in the cleaning operation and to remove nearly all foreign material from air passing therethrough, suction-creating means connected at its suction side to said preliminary separator to draw air therethrough, a final dirt separator connected to said suction-creating means to receive air exhausted therefrom and including a dirt-collecting element permeable to air and impermeable to dirt and on which dirt collects, a dirt-removing nozzle movable relative to said dirt-collecting element, and means to apply the entire air-drawing power of said suction-creating means at said nozzle comprising air-conducting means connecting said nozzle to the intake of said preliminary separator.

10. A vacuum cleaner having a preliminary dirt separator adapted to receive dirt-laden air directly from a cleaning nozzle or the like in the cleaning operation and to remove nearly all foreign material from air passing therethrough, suction-creating means connected at its suction side to said preliminary separator to draw air therethrough, a final dirt separator connected to said suction-creating means to receive air exhausted therefrom and including a fabric filter through which air can pass and upon which dirt can be impacted by the air passing therethrough, a dirt-removing nozzle movable in said final separator and over said fabric filter, and means to apply the entire air-drawing power of said suction-creating means at said nozzle comprising air-conducting means connecting said nozzle to the intake of said preliminary separator.

11. A vacuum cleaner having a preliminary dirt separator adapted to receive dirt-laden air directly from a cleaning nozzle or the like in the cleaning operation and to remove nearly all foreign material from air passing therethrough, suction-creating means connected at its suction side to said preliminary separator to draw air therethrough, a final dirt separator connected to said suction-creating means to receive air exhausted therefrom and including a dirt-collecting element permeable to air and impermeable to dirt and on which dirt collects, a dirt-removing nozzle movable over said dirt-collecting element, manually operable means including a part accessible from the exterior of said cleaner to actuate said nozzle, and manually operable means to connect said nozzle to and to disconnect said nozzle from the intake of said preliminary separator to enable the air drawn by said suction-creating means to remove the dirt removed by said nozzle directly into said preliminary separator.

12. A vacuum cleaner having a preliminary dirt separator adapted to receive dirt-laden air directly from a cleaning nozzle or the like in the cleaning operation and to remove nearly all foreign material from air passing therethrough, suction-creating means connected at its suction side to said preliminary separator to draw air therethrough, a final dirt separator connected to said suction-creating means to receive air exhausted therefrom and including a dirt-collecting element permeable to air and impermeable to dirt and on which dirt collects, a suction nozzle smaller than said element and arranged to contact a part only of the dirt-collecting side of said element at one time, manually connectible means to connect said nozzle to the intake of said preliminary separator to provide suction in said nozzle whereby the direction of the flow of air through said dirt-collecting element is reversed where contacted by said nozzle and manually operable means to effect relative movement between said element and said dirt-collecting nozzle.

13. A vacuum cleaner having a preliminary dirt separator adapted to receive dirt-laden air directly from a cleaning nozzle or the like in the cleaning operation, a final dirt separator, a suction-creating fan unit to move air through said separators, dirt-removing means for said final separator, and air-conducting means constructed and arranged to connect said dirt-removing means to a point of reduced pressure created by said suction-creating fan unit to apply the entire air-moving power of said unit to said dirt-removing means.

14. In a vacuum cleaner, a whirl chamber for preliminary air cleaning adapted to receive dirt-laden air directly from a cleaning nozzle or the like in the cleaning operation, a final air-filtering chamber having an air-permeable wall, suction-creating means for moving air through said chambers and connected therebetween, an intermittently operative cleaning nozzle for said permeable wall, means to connect said nozzle to and disconnect said nozzle from said suction-creating means at a point ahead of said whirl chamber, and means to effect relative movement between said nozzle and said wall.

15. A vacuum cleaner comprising: a hollow base member; a dust pan within said base member; a housing carried by said base member and positioned thereover; a whirl chamber in said housing open to said dust pan; means for introducing air into said whirl chamber at its periphery; a motor-operated blower device supported from said housing; an intake sleeve from said blower device extending axially downward into said whirl chamber to evacuate air from the lower mid-portion thereof; and a cylindrical fabric partition wall in said housing between said whirl chamber and the wall of said housing dividing the latter into an annular filter chamber and an annular discharge chamber, said blower device discharging into said filter chamber.

16. A vacuum cleaner comprising: a hollow base member; a dust pan within said base member; a housing carried by said base member and positioned thereover; a whirl chamber in said housing open to said dust pan; means for introducing air into said whirl chamber at its periphery; a motor-operated blower device supported from said housing; an intake sleeve from said blower device extending axially downward into said whirl chamber to evacuate air from the lower mid-portion thereof; a cylindrical fabric partition wall in said housing between said whirl chamber and the wall of said housing dividing the latter into an annular filter chamber and an annular discharge chamber, said blower device discharging into said filter chamber; and means operable from the exterior of said housing for cleaning said fabric partition wall.

17. A vacuum cleaner comprising: a hollow base member; a dust pan within said base member; a housing mounted on said base member; a whirl chamber in said housing opening to said dust pan; means for introducing air into said whirl chamber at its periphery; a motor-operated blower device supported from said housing; an intake sleeve from said blower device extending axially downward into said whirl chamber to evacuate air from the lower mid-portion thereof, said whirl chamber having a larger diameter at its bottom than at its top; and means for sealing said whirl chamber to said dust pan when said housing is closed over said base member.

18. A vacuum cleaner comprising: a hollow base member; a dust pan within said base member; a housing mounted on said base member; a whirl chamber in said housing opening to said dust pan; means for introducing air into said whirl chamber at its periphery; a motor-operated blower device supported from said housing; an intake sleeve from said blower device extending axially downward into said whirl chamber to evacuate air from the lower mid-portion thereof; a cylindrical fabric partition wall in said housing between said whirl chamber and the wall of said housing dividing the latter into an annular filter chamber and an annular discharge chamber, said blower device discharging into said filter chamber; a movable suction nozzle within said filter chamber for cleaning the inner surface of said fabric partition wall; and means for connecting said suction nozzle with the intake of said blower.

19. A vacuum cleaner of the type having connected in the order enumerated a preliminary dirt-separating chamber adapted to receive dirt-laden air directly from a cleaning nozzle or the like in the cleaning operation, suction-creating means, a final dirt-separating chamber, and a discharge chamber, said final dirt-separating chamber being telescopically arranged with respect to said preliminary dirt-separating chamber, and a ring-like cleaning nozzle encircling said preliminary dirt-separating chamber and within and extending around said final dirt-separating chamber and movable therealong in its cleaning operation.

20. In a vacuum cleaner, a dry separator adapted to receive dirt-laden air directly from a cleaning nozzle or the like in the cleaning operation and to remove nearly all the dirt from said air, suction-creating means connected to said separator to draw air therefrom, means connected to the exhaust of said suction-creating means to filter the air exhausted therefrom by the impingement of the dirt thereon, and means to remove dirt from said last-mentioned means and return it to said dry separator for separation therein.

21. In a vacuum cleaner, a dirt separator formed with a dirty air intake and an air exhaust and adapted to receive dirt-laden air directly from a cleaning nozzle or the like in the cleaning operation, suction-creating means connected to said exhaust to draw air from said separator, means connected to said suction-creating means to receive air drawn from said separator to filter the air exhausted from said suction-creating means by impingement of the dirt thereon, dirt-removing means to remove the collected dirt from said means to filter the air, and means connectible to the intake of said separator to convey said dirt thereto.

22. In a vacuum cleaner, a dirt separator adapted to receive dirt-laden air directly from a cleaning nozzle or the like in the cleaning operation and to remove nearly all the dirt from said air, suction-creating means connected to said separator to draw air therefrom, a final air-pervious, dirt-impervious filter connected to the exhaust of said suction-creating means, and means to remove dirt from said filter and to return it to said separator for separation therein.

WALTER E. BIBLE.

CERTIFICATE OF CORRECTION.

Reissue No. 22,336. June 22, 1943.

WALTER E. BIBLE.

It is hereby certified that error appears in the printed specification of the above numbered patent requiring correction as follows: Page 4, first column, line 45, claim 13, strike out the words "unit to move air through" and insert instead --unit connected to move the main air stream through--; and that the said Letters Patent should be read with this correction therein that the same may conform to the record of the case in the Patent Office.

Signed and sealed this 16th day of November, A. D. 1943.

Henry Van Arsdale,
Acting Commissioner of Patents.

(Seal)